(12) United States Patent
Gantz et al.

(10) Patent No.: US 6,591,787 B1
(45) Date of Patent: Jul. 15, 2003

(54) PET CONSOLE SEAT

(76) Inventors: James Gantz, 1713 S. Cranberry Blvd., North Port, FL (US) 34281; Bette A. Gantz, 1713 S. Cranberry Blvd., North Port, FL (US) 34281

( * ) Notice: Subject to any disclaimer, the term of this patent is extended or adjusted under 35 U.S.C. 154(b) by 0 days.

(21) Appl. No.: 10/242,834

(22) Filed: Sep. 13, 2002

(51) Int. Cl.$^7$ .................. A01K 15/04; B60R 21/00
(52) U.S. Cl. ............... 119/771; 297/488; 297/751
(58) Field of Search ............... 119/771, 769, 119/770, 28.5; 297/468, 469, 488; 280/290, 801.1, 802, 748, 751; D6/333

(56) References Cited

U.S. PATENT DOCUMENTS

| | | | | |
|---|---|---|---|---|
| 2,499,103 A | * | 2/1950 | Love | 224/549 |
| 3,310,034 A | * | 3/1967 | Dishart | 119/771 |
| 3,436,770 A | * | 4/1969 | Turner | 5/94 |
| 3,767,259 A | * | 10/1973 | Blake et al. | 297/256.13 |
| D245,716 S | * | 9/1977 | Russo | D30/118 |
| 4,500,135 A | * | 2/1985 | Kincheloe | 297/216.11 |
| 4,512,286 A | * | 4/1985 | Rux | 122/380 |
| 4,597,359 A | * | 7/1986 | Moorman | 119/28.5 |
| 4,889,388 A | * | 12/1989 | Hime | 297/464 |
| 5,005,526 A | * | 4/1991 | Parker | 119/751 |
| 5,123,377 A | * | 6/1992 | Edwards | 119/28.5 |
| 5,133,294 A | * | 7/1992 | Reid | 119/771 |
| 5,136,981 A | * | 8/1992 | Barreto et al. | 119/28.5 |
| 5,479,892 A | * | 1/1996 | Edwards | 119/771 |
| 5,533,785 A | * | 7/1996 | Gould | 297/250.1 |
| 5,551,373 A | * | 9/1996 | O'Donnell | 119/28.5 |
| 5,685,258 A | * | 11/1997 | Fricano | 119/28.5 |
| 5,718,191 A | * | 2/1998 | O'Donnell | 119/771 |
| 5,785,003 A | * | 7/1998 | Jacobsen et al. | 119/28.5 |
| 6,305,317 B1 | * | 10/2001 | Spiegel | 119/28.5 |
| D461,966 S | * | 8/2002 | Reece | D6/356 |

\* cited by examiner

Primary Examiner—Yvonne Abbott

(57) ABSTRACT

Pet console seats are desirable for safely and currently securing a pet during transportation. Excited pets can be very distracting to the driver and can be especially dangerous if the pet interferes with access to the vehicle's pedals. Pet console seats secure the pet over the center console by means of a leash attached to the pet's harness. The pet console seat is prevented from moving forward by a bar engaging with the rear of the vehicle's bucket seats. A pet seating portion is provided on the top of the pet console seat to prevent the pet from sliding around during transport. The pet is provided with a view of the outside through the windshield and a cushioned platform upon which to sit or lie. Furthermore, in the event of an accident, the pet cannot be thrown inside of the vehicle.

19 Claims, 4 Drawing Sheets

PET CONSOLE SEAT

BACKGROUND OF THE INVENTION

1. Field of the Invention

The present invention relates to a pet console seat for use in connection with automobiles. The pet console seat has particular utility in connection with safely and comfortably securing a pet during transportation.

2. Description of the Prior Art

Pet console seats are desirable for safely and currently securing a pet during transportation. Automobile travel frequently excites pets, leading them to explore the views offered by the various windows and other aspects of the vehicle. This behavior can be very distracting to the driver and can be especially dangerous if the pet interferes with access to the vehicle's pedals. Pet console seats secure the pet over the center console, thereby preventing the pet from distracting the driver. The pet is provided with a view of the outside through the windshield and a cushioned platform upon which to sit or lie. Furthermore, in the event of an accident, the pet cannot be thrown inside of the vehicle.

The use of supplemental automobile seats for use by dogs is known in the prior art. For example, U.S. Pat. No. 5,487,361 to Dean discloses a supplemental automobile seat for use by dogs. However, the Dean '361 patent does not sit atop the center console, and has further drawbacks of not having a bar securing it against the rear of bucket seats.

U.S. Pat. No. 5,133,294 to Reid discloses a pet carrier for vehicles that fits on a passenger seat of a vehicle. However, the Reid '294 patent does not sit atop the center console, and additionally does not have a bar securing it against the rear of bucket seats.

Similarly, U.S. Pat. No. 4,512,286 to Rux discloses a pet seat for automobiles that mounts on the seat of a vehicle. However, the Rux '286 patent does not sit atop the center console, and does not have a bar securing it against the rear of bucket seats.

In addition, U.S. Pat. No. 5,479,892 to Edwards discloses a vehicle safety seat for pets that includes four relatively low walls about a central pet seating area. However, the Edwards '892 patent does not sit atop the center console, and also does not have a bar securing it against the rear of bucket seats.

Furthermore, U.S. Pat. No. Des. 376,447 to Stump discloses a pet car seat that sits on a passenger seat of a vehicle. However, the Stump '447 patent does not sit atop the center console, and further lacks a bar securing it against the rear of bucket seats.

Lastly, U.S. Pat. No. 5,551,373 to O'Donnell discloses a portable pet booster seat apparatus that sits on the seat of a motor vehicle. However, the O'Donnell '373 patent does not sit atop the center console, and has the additional deficiency of not having a bar securing it against the rear of bucket seats.

While the above-described devices fulfill their respective, particular objectives and requirements, the aforementioned patents do not describe a pet console seat that allows safely and comfortably securing a pet during transportation. The above patents make no provision for sitting atop the center console of a vehicle nor having a bar securing them against the rear of bucket seats.

Therefore, a need exists for a new and improved pet console seat that can be used for safely and comfortably securing a pet during transportation. In this regard, the present invention substantially fulfills this need. In this respect, the pet console seat according to the present invention substantially departs from the conventional concepts and designs of the prior art, and in doing so provides an apparatus primarily developed for the purpose of safely and comfortably securing a pet during transportation.

SUMMARY OF THE INVENTION

In view of the foregoing disadvantages inherent in the known types of supplemental automobile seats for use by dogs now present in the prior art, the present invention provides an improved pet console seat, and overcomes the above-mentioned disadvantages and drawbacks of the prior art. As such, the general purpose of the present invention, which will be described subsequently in greater detail, is to provide a new and improved pet console seat which has all the advantages of the prior art mentioned heretofore and many novel features that result in a pet console seat which is not anticipated, rendered obvious, suggested, or even implied by the prior art, either alone or in any combination thereof.

To attain this, the present invention essentially comprises a seat attachment mechanism attached to one end of a seat frame.

There has thus been outlined, rather broadly, the more important features of the invention in order that the detailed description thereof that follows may be better understood and in order that the present contribution to the art may be better appreciated.

The invention may also include the seat attachment mechanism being a bar that fits behind a pair of bucket seats. The seat frame may have opposing L-shaped ends. One end of the seat frame may have an eye loop that receives one end of a removably attached leash. The opposing end of the leash may be adapted to removably attached to a pet harness. The leash may be elastic. Padding may surround the seat frame. A cover may enclose the padding. The top of the padding may have an indentation to comprise a pet seating portion. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet console seat that has all of the advantages of the prior art supplemental automobile seats for use by dogs and none of the disadvantages.

It is another object of the present invention to provide a new and improved pet console seat that may be easily and efficiently manufactured and marketed.

An even further object of the present invention is to provide a new and improved pet console seat that has a low cost of manufacture with regard to both materials and labor, and which accordingly is then susceptible of low prices of sale to the consuming public, thereby making such pet console seat economically available to the buying public.

Still another object of the present invention is to provide a new pet console seat that provides in the apparatuses and methods of the prior art some of the advantages thereof, while simultaneously overcoming some of the disadvantages normally associated therewith.

Even still another object of the present invention is to provide a pet console seat for safely and comfortably securing a pet during transportation. This allows the pet to sit comfortably.

Still yet another object of the present invention is to provide a pet console seat for safely and comfortably securing a pet during transportation. This makes it possible to restrain the pet from running around inside the vehicle.

An additional object of the present invention is to provide a pet console seat for safely and comfortably securing a pet during transportation. This increases the pet's safety in an accident.

A further object of the present invention is to provide a pet console seat for safely and comfortably securing a pet during transportation. This provides the pet with a view out of the windshield.

Lastly, it is an object of the present invention to provide a new and improved pet console seat for safely and comfortably securing a pet during transportation.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
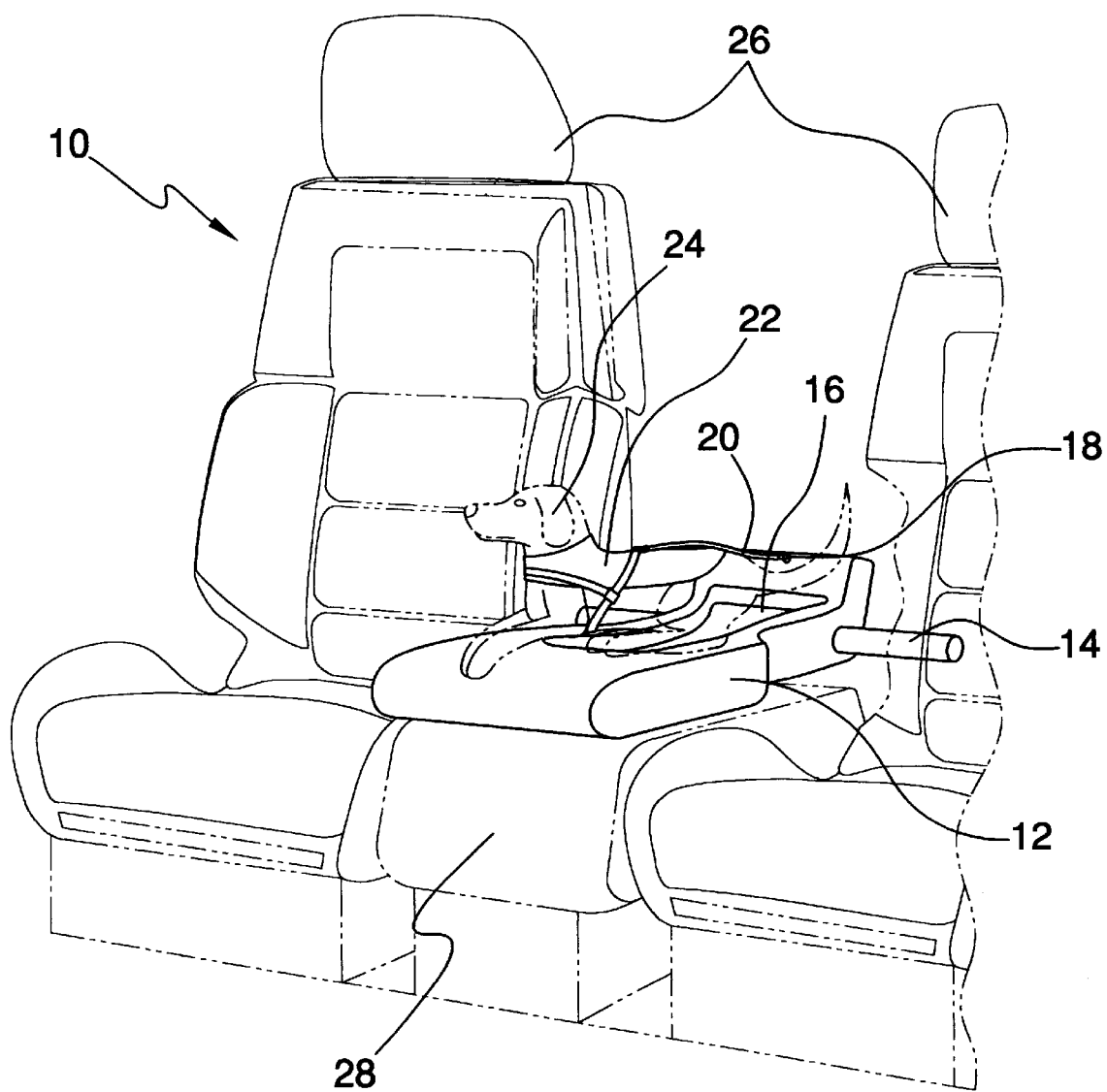
FIG. 1 is a front perspective view of the current embodiment of the pet console seat constructed in accordance with the principles of the present invention.

Referring now to the drawings, and particularly to FIGS. 1–4, a current embodiment of the pet console seat of the present invention is shown and generally designated by the reference numeral 10.

In FIG. 1, a new and improved pet console seat 10 of the present invention for safely and comfortably securing a pet during transportation is illustrated and will be described. More particularly, the pet console seat 10 has a cover 12 enclosing pet console seat 10. Bar 14 prevents the pet console seat 10 from moving forward by resting against the rear of bucket seats 26. The pet console seat 10 rests atop center console 28. A pet 24 lies upon the pet seating portion 16. One end of leash 20 is removably secured to pet harness 22 while the opposing end of leash 20 is removably attached to eye loop 18. In the current embodiment, cover 12, bar 14, and eye loop 18 are made of plastic. Leash 20 is elastic and restrains the pet 24 in the pet seating portion 16 of the pet console seat 10. Note that the pet harness 22, pet 24, bucket seats 26, and center console 28 are for illustrative purposes only and are not part of the current invention.

Figure 2:
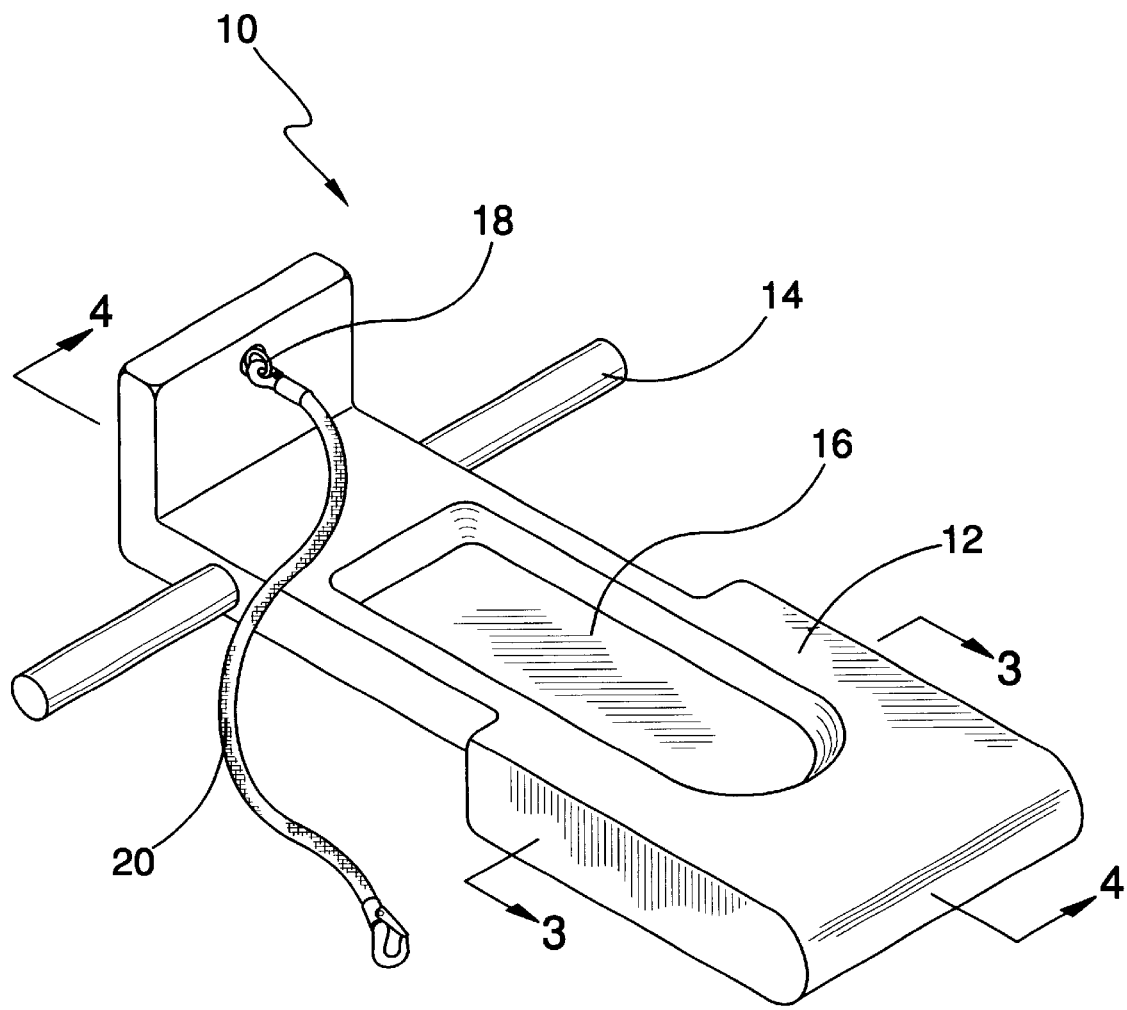
FIG. 2 is a top perspective view of the pet console seat of the present invention.

Moving on to FIG. 2, a new and improved pet console seat 10 of the present invention for safely and comfortably securing a pet during transportation is illustrated and will be described. More particularly, the pet console seat 10 has a cover 12 enclosing the pet console seat 10. An indentation in the top of pet console seat 10 provides a pet seating portion 16. Bar 14 is shown inserted through one end of pet console seat 10. Eye loop 18 is attached above bar 14 and has one end of leash 20 removably connected to it. The other end of leash 20 is adapted to removably attach to a pet harness 22 (not shown).

Figure 3:
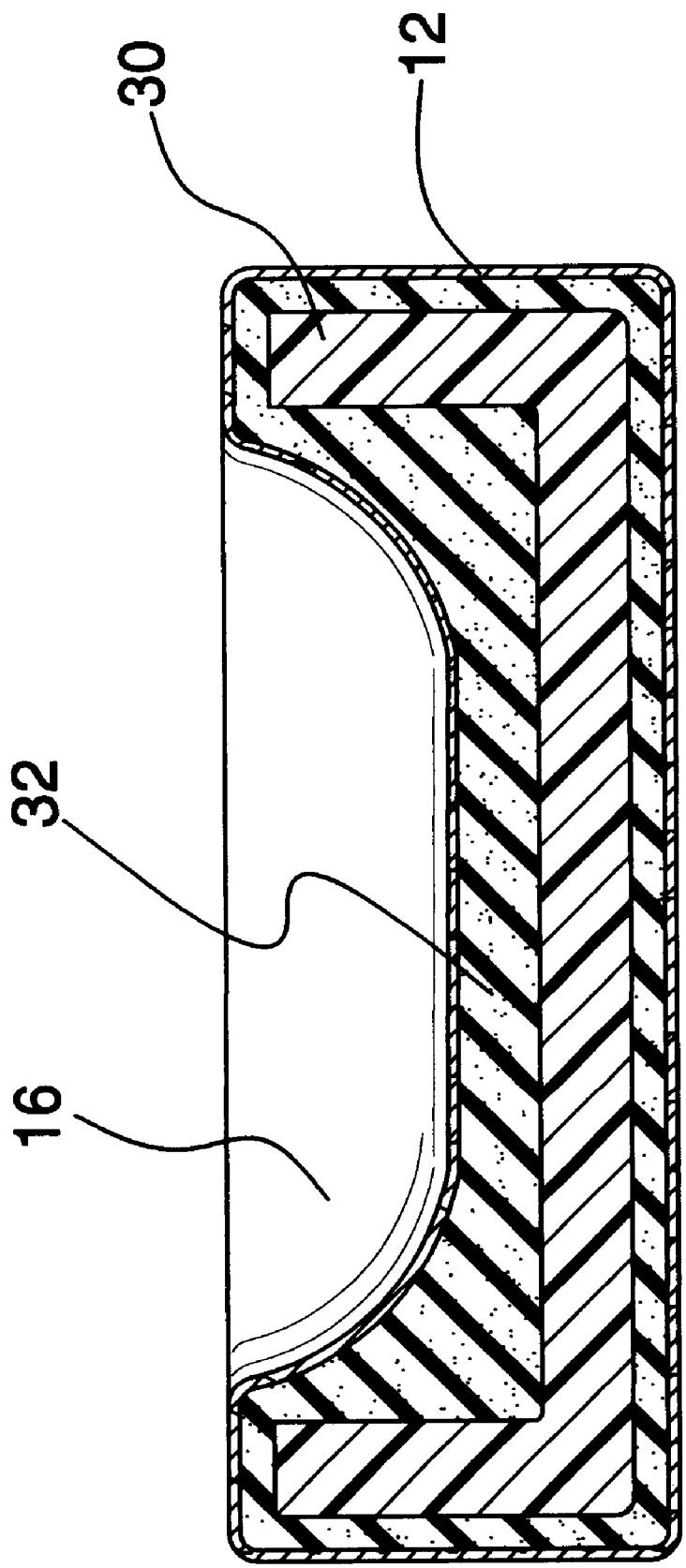
FIG. 3 is a front sectional view of the seat frame of the present invention.

Continuing with FIG. 3, a new and improved seat frame 30 of the present invention for safely and comfortably securing a pet during transportation is illustrated and will be described. More particularly, the seat frame 30 has a pet seating portion 16 resulting from an indentation in padding 32. Padding 32 encircles seat frame 30. Cover 12 encloses padding 32. Seat frame 30 provides a structural backbone for the pet console seat 10 and is made of plastic in the current embodiment. Padding 32 is made of polyurethane foam in the current embodiment.

Figure 4:
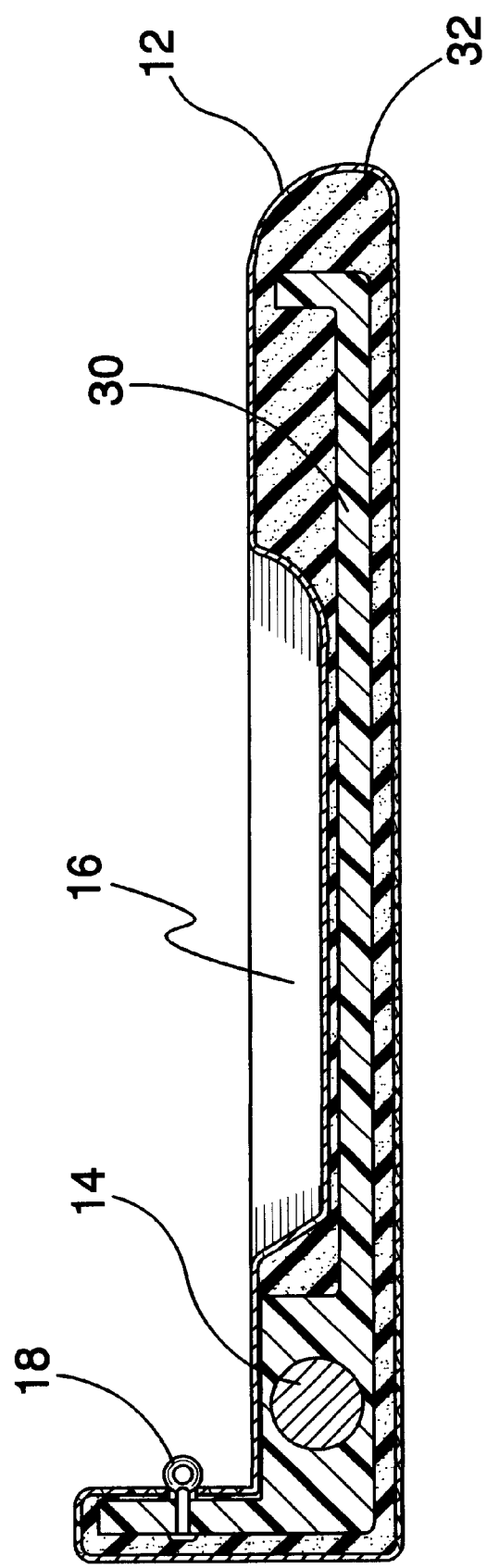
FIG. 4 is a side sectional view of the seat frame of the present invention.

Concluding with FIG. 4, a new and improved seat frame 30 of the present invention for safely and comfortably securing a pet during transportation is illustrated and will be described. More particularly, the seat frame 30 has a pet seating portion 16 resulting from an indentation in padding 32. Cover 12 encloses padding 32, while padding 32 surrounds seat frame 30. Seat frame 30 has opposing L-shaped ends. Bar 14 is inserted through one end of seat frame 30. Eye loop 18 is connected to seat frame 30 above bar 14. The pet seating portion 16 helps prevent a pet 24 (not shown) from sliding from side to side or forwards and backwards by having sloped sides.

In use, it can now be understood that the user installs the pet console seat by placing it atop center console 28 with bar 14 behind bucket seats 26. A pet 24 is placed in pet seating portion 16, and one end of leash 20 is attached to pet harness 22. The other end of leash 20 is attached to eye loop 18. The pet 24 remains attached to leash 20 until the destination is reached, at which point least 20 is disconnected from pet harness 22. At that point, the pet console seat 10 can optionally be removed by lifting it until bar 14 is no longer engaged with the rear of bucket seats 26.

While a current embodiment of the pet console seat has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by present invention. For example, any suitable sturdy material such as steel, aluminum, titanium, wood, or carbon fiber composite may be used instead of the plastic bar, seat frame, and eye loop described. Also, the plastic cover may also be made of leather or a variety of fabrics. Furthermore, a wide variety of cushioning materials may be used instead of the polyurethane foam padding described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pet console seat comprising:
    a bar having a middle; and
    a seat frame having opposing ends with one end attached to said bar.
2. The pet console seat of claim 1, wherein said opposing ends of said seat frame are L-shaped.
3. The pet console seat of claim 1, further comprising an eye loop connected to said end of said seat frame.
4. The pet console seat as defined in claim 3, further comprising a leash having opposing ends with one end removably connected to said eye loop and said opposing end adapted to removably connect to a pet harness.
5. The pet console seat as defined in claim 1, further comprising padding having a top surrounding said seat frame.
6. The pet console seat as defined in claim 5, further comprising a cover enclosing said padding.
7. The pet console seat as defined in claim 5, further comprising a pet seating portion wherein said top of said padding comprises an indentation therein to comprise said pet seating portion.
8. The pet console seat as defined in claim 6, wherein said cover is selected from the group consisting of plastic, leather, and cloth.
9. The pet console seat as defined in claim 5, wherein said padding is selected from the group consisting of polystyrene foam and polyurethane foam.
10. The pet console seat as defined in claim 1, wherein said bar is selected from the group consisting of plastic, aluminum, titanium, steel, wood, and carbon fiber composite.
11. The pet console seat as defined in claim 1, wherein said seat frame is selected from the group consisting of plastic, aluminum, titanium, steel, wood, and carbon fiber composite.
12. A pet console seat comprising:
    a seat frame having opposing L-shaped ends;
    a seat attachment mechanism inserted through one of said ends of said seat frame;
    padding having a top surrounding said seat frame; and
    a cover enclosing said padding.
13. The pet console seat as defined in claim 12, further comprising a pet seating portion wherein said top of said padding comprises an indentation therein to comprise said pet seating portion.
14. The pet console seat as defined in claim 12, further comprising:
    an eye loop connected to said end of said seat frame; and
    a leash having opposing ends with one end removably attached to said eye loop and said opposing end adapted to removably attach to a pet harness.
15. The pet console seat as defined in claim 14, wherein said leash is elastic.
16. The pet console seat as defined in claim 12, wherein said seat attachment mechanism is adapted to secure the pet console seat between two bucket seats.
17. The pet console seat as defined in claim 12, wherein said seat frame is adapted to sit atop a vehicle center console.
18. The pet console seat as defined in claim 12, wherein said seat attachment mechanism comprises a bar.
19. In combination with an automobile, including a center console having a top and bucket seats having a rear side, the improvement which comprises:
    a seat frame having opposing L-shaped ends and a bottom with said bottom resting atop said center console;
    a bar having a sidewall inserted through said one of said ends of said seat frame wherein said sidewall rests against said rear of said bucket seats so as to prevent forward movement of said seat frame;
    padding having a top surrounding said seat frame;
    a pet seating portion, wherein said top of said padding comprises an indentation therein to comprise said pet seating portion;
    a cover enclosing said padding;
    an eye loop connected to said end of said seat frame; and
    a leash having opposing ends with one end removably attached to said eye loop and said opposing end adapted to removably attach to a pet harness.

* * * * *